US009135833B2

(12) United States Patent
  Guleria

(10) Patent No.: US 9,135,833 B2
(45) Date of Patent: Sep. 15, 2015

(54) PROCESS FOR SELECTING COMPRESSED KEY BITS FOR COLLISION RESOLUTION IN HASH LOOKUP TABLE

(71) Applicant: TELEFONAKTIEBOLAGET L M ERICSSON (PUBL), Stockholm (SE)

(72) Inventor: Vikram Guleria, Milpitas, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 392 days.

(21) Appl. No.: 13/859,606

(22) Filed: Apr. 9, 2013

(65) Prior Publication Data

US 2014/0301549 A1 Oct. 9, 2014

(51) Int. Cl.
  *G06F 7/00* (2006.01)
  *H04L 9/00* (2006.01)
  *G09C 1/00* (2006.01)
  *H04L 9/08* (2006.01)
  *H04L 9/32* (2006.01)

(52) U.S. Cl.
  CPC ............... *G09C 1/00* (2013.01); *H04L 9/0836* (2013.01); *H04L 9/3236* (2013.01); *H04L 2209/043* (2013.01)

(58) Field of Classification Search
  CPC ............ H04L 49/3009; H04L 45/7453; H04L 45/745; G06F 17/30; G06F 17/30097; G06F 17/3033; G06F 17/30949
  USPC ..................................... 380/44; 707/769, 747
  See application file for complete search history.

(56) References Cited

U.S. PATENT DOCUMENTS

| 5,920,900 | A | * | 7/1999 | Poole et al. | 711/216 |
| 7,984,028 | B2 | * | 7/2011 | Laursen et al. | 707/698 |
| 8,312,066 | B2 | * | 11/2012 | Jagannathan et al. | 707/899 |
| 8,429,143 | B2 | * | 4/2013 | Ellison et al. | 707/698 |
| 8,806,174 | B2 | * | 8/2014 | Sadri et al. | 711/216 |
| 9,020,953 | B1 | * | 4/2015 | Zilmer et al. | 707/747 |
| 2008/0109395 | A1 | * | 5/2008 | Loeb | 707/1 |
| 2011/0060876 | A1 | * | 3/2011 | Liu | 711/108 |
| 2012/0136889 | A1 | * | 5/2012 | Jagannathan et al. | 707/769 |
| 2013/0159629 | A1 | * | 6/2013 | Sadri et al. | 711/128 |
| 2014/0032569 | A1 | * | 1/2014 | Kim et al. | 707/747 |
| 2014/0301394 | A1 | * | 10/2014 | Arad et al. | 370/392 |

OTHER PUBLICATIONS

Moring, Pat. Dictionary Structures. 2005. Chapman & Hall/CRC. Chapter 9. pp. 1-20.*

* cited by examiner

*Primary Examiner* — Dede Zecher
*Assistant Examiner* — Abdullah Almamun
(74) *Attorney, Agent, or Firm* — Nicholson De Vos Webster & Elliot, LLP

(57) ABSTRACT

A method and network element identify a set of bit indices for forming compressed keys, which are used to map a set of keys of corresponding input values to assigned lookup values in a hash table, where the keys of the input values have colliding hash values according to a hash function of the hash table. The method includes a set of steps including receiving the set of keys. The bits of the set of keys are traversed to find a best split bit index. The set of keys are split into two subsets according to the best split bit index. A check is made whether all of the set of keys have been split into separate subsets. A selected best split bit is added to a bit index. Alternate split bits are tallied and a bit is selected with a highest tally to add to bit index.

10 Claims, 7 Drawing Sheets

```
BIT INDICES [0][1][2][3]
  A -  0 1 0 1
  B -  1 0 0 0       - INITIAL SET
  C -  1 1 0 1    BIT INDEX [0]
  D -  0 0 1 1      SELECTED
         1 \   / 0
      BIT              BIT
   B  INDEX       A  INDEX
   C   [1]        D   [1]
   SELECTED        SELECTED
      0 / 1         1 \ 0
    B    C        A    D

FINAL BIT INDEX [0,1]
```

| Bit 7 | Bit 6 | Bit 5 | Bit 4 | Bit 3 | Bit 2 | Bit 1 | Bit 0 |
|---|---|---|---|---|---|---|---|
| Type = NT_MTRIE | | | | Checksum | | | PushPtr |
| DSize[1:0] | | Stride[4:0] | | | | | KeyIdx[8] |
| KeyIdx[7:0] | | | | | | | |
| Base_RID[7:0] | | | | | | | |
| Base_Offset[31:4] | | | | | | PushDflt | Interleave[2:0] |

FIG. 1B

| Bit 7 | Bit 6 | Bit 5 | Bit 4 | Bit 3 | Bit 2 | Bit 1 | Bit 0 |
|---|---|---|---|---|---|---|---|
| Type = NT_COMPRESS | | | | Checksum | | | PushPtr |
| DSize[1:0] | | EffectiveStride[4:0] | | | | | KeyIdx[8] |
| KeyIdx[7:0] | | | | | | | |
| Base_RID[7:0] | | | | | | | |
| Base_Offset[31:4] | | | | | | | |
| | | | | PushDflt | Interleave[2:0] | | |
| Extract_Bit[0][7:0] | | | | | | | |
| Extract_Bit[1][7:0] | | | | | | | |
| Extract_Bit[2][7:0] | | | | | | | |
| Extract_Bit[3][7:0] | | | | | | | |
| Extract_Bit[4][7:0] | | | | | | | |
| Extract_Bit[5][7:0] | | | | | | | |
| Extract_Bit[6][7:0] | | | | | | | |
| Extract_Bit[7][7:0] | | | | | | | |

FIG. 1C

PROCESS FOR SELECTING COMPRESSED KEY BITS FOR COLLISION RESOLUTION IN HASH LOOKUP TABLE

FIELD

Embodiments of the invention relate to the field of hash table collision resolution; and more specifically, to a process and system for determining compressed key bits to index leaves of a hash table at a compressed node of the hash table.

BACKGROUND

A hash table is a data structure used fast and efficient lookup of information using a key derived from an input. The hash table can be implemented in an associative array, which is a structure that can map the keys to the information. The hash table uses a hash function to compute an index into an array of buckets containing the corresponding information (the buckets can also be referred to as slots). Upon input of the key, the hash function is executed and the resulting index used to obtain the correct value from the data structure.

The hash table is more efficient than using the entire key, which may be quite large, because a lookup using a smaller index is faster even with the overhead of the hash function execution. The hash function should generate an index to map each possible input key to a unique bucket, but the hash function is not always able to achievable this one to one relationship in practice. Instead, most hash table designs assume that hash collisions can occur. A hash collision is a case where two input keys generate the same key index when the hash function is applied. Thus, both keys are assigned by the hash function to the same bucket, which requires a collision resolution process to correct or a carefully controlled hash table.

In a well-dimensioned hash table, the resources required for each lookup is independent of the number of different elements stored in the hash table. A hash table designs can also support insertions and deletions of buckets. In many scenarios, hash tables are the most efficient table lookup structure. For this reason, they are widely used in many kinds of computer programs for fast data lookup.

Hash table collision resolution is often needed when hashing a random subset of a large set of possible keys. Therefore, most hash table implementations have some collision resolution strategy to handle such events. All these methods require that the keys (or pointers to them) be stored in the table, together with the associated values.

SUMMARY

A method is implemented by a network element to identify a set of bit indices for forming compressed keys, the compressed keys are used to map a set of keys of corresponding input values to assigned lookup values in a hash table, where the keys of the input values have colliding hash values according to a hash function of the hash table. The method includes a set of steps including receiving the set of keys having colliding hash values. The bits of the set of keys are traversed to find a best split bit index that most closely splits the set of keys into equal subsets at a current level of the array of bit indices. The set of keys are split into two subsets according to the best split bit index for the current level. A check is made whether all of the set of keys have been split into separate subsets. A selected best split bit is added to a bit index, for subsets larger than one key. Alternate split bits are tallied at a combine level for each subset of the keys and a bit is selected with a highest tally to add to bit index.

A network element is configured to execute a process to identify a set of bit indices for forming compressed keys, the compressed keys are used to map a set of keys of corresponding input values to assigned lookup values in a hash table, where the keys of the input values have colliding hash values according to a hash function of the hash table. The network element includes a set of components including a storage device to store a hash table including a plurality of elements mapped to the set of keys using the hash function. The network element also includes a network processor configured to execute a hash module and a bit selector. The hash module updates a hash table. The bit selector receives the set of keys having colliding hash values from the hash module and traverses bits of the set of keys to find a best split bit index that most closely splits the set of keys into equal subset at a current level of the array of bit indices. The bit selector then splits the set of keys into two subsets according to the best split bit index for the current level and checks whether all of the set of keys have been split into separate subsets. The bit selector adds a selected best split bit to a bit index, for subsets larger than one key, tallies alternate split bits at a combine level for each subset of the keys, and selects a bit with a highest tally to add to the bit index.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings:

FIG. 1B is a diagram of an example root node of the hash table.

FIG. 1C is a diagram of an example compress node of the hash table.

DESCRIPTION OF EMBODIMENTS

Figure 1A:
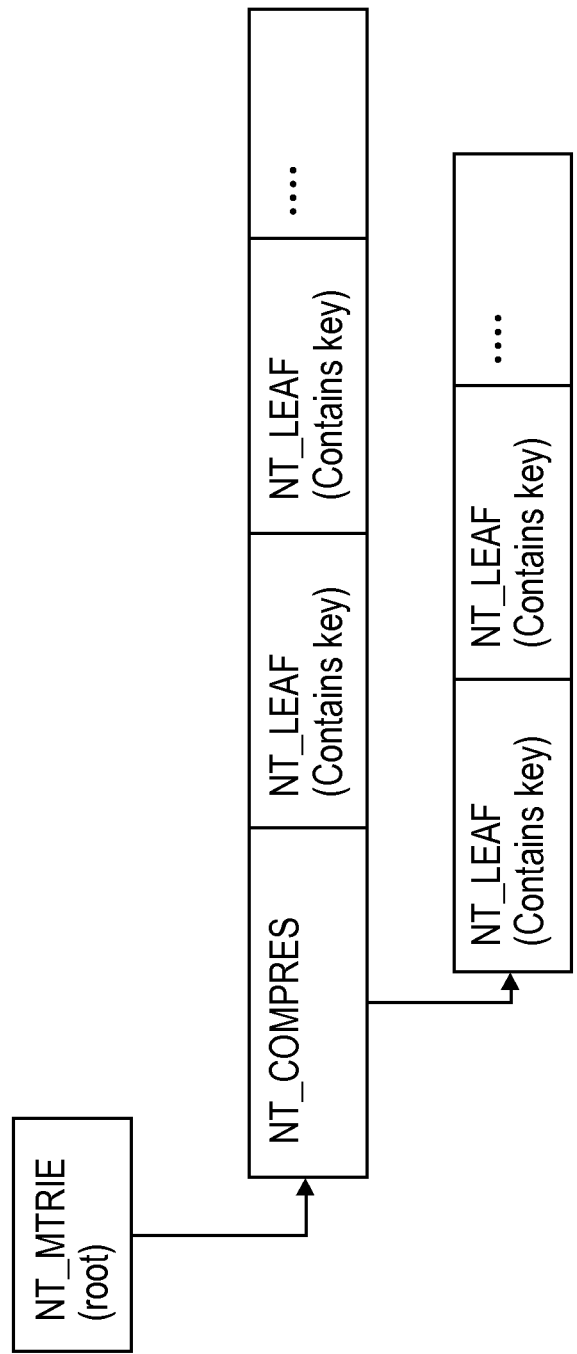
FIG. 1A is a diagram of an example hash table structure.

In the following description, numerous specific details are set forth. However, it is understood that embodiments of the invention may be practiced without these specific details. In other instances, well-known circuits, structures and techniques have not been shown in detail in order not to obscure the understanding of this description. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flowcharts will be described with reference to the exemplary embodiment illustrated in the diagrams. However, it should be understood that the operations of flowcharts can be performed by embodiments of the invention other than those discussed with reference to diagrams, and the embodiments discussed with reference to diagrams can perform operations different than those discussed with reference to the flowcharts.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange routes and select those routes based on one or more routing metrics.

The embodiments of the invention described herein below provide a method and system for implementing a process to select a minimal set of bits to optimize resource usage for collision resolution in a hash table and to achieve this in $O(\log(N))$ iterations in the best case, where N is number of colliding elements. The process and system produce a memory utilization of more than 86% for a hash table with 64000 keys and only 32000 buckets.

The embodiments of the invention overcome the disadvantages of the prior art. In a typical hash table implementation multiple lookup keys can collide in a single bucket. For example, a spider hardware lookup table can be programmed to select a set of bits from the lookup key to compute a compressed key. The bits to be selected should be programmed in such a way that resulting compressed key could uniquely identify all the colliding keys in that hash bucket.

Different algorithms might end up choosing different bit position and different number of bits to resolve collision. The number of bits in a compressed key determines how much memory is required to store the colliding keys. Selecting the best possible combination of bits is also computationally intensive. The computation complexity of the process impacts the insertion time in a hash table. So an optimal selection process is required that could minimize memory usage and also gives satisfactory hash table insertion time.

The embodiments include a process and system, where for a given set of keys a bit index is considered a best split if it divides the set into two sets, better than any other bit index. The process first picks the best split bit index for a set of keys corresponding to a colliding hash bucket. Then the process splits the keys into two sets and adds them to a next level array. At the next level of the array each subset of keys is then analyzed to find the respective best split indices and then is updated to a common level split index array. The split index array maintains a count for each bit index, which represents the number of subsets in the current level that consider that index as best split index.

The process sorts the level split index array such that the index selected by most sub-sets is the first in the level-array. If the sub-set's best split index is one of already selected bits in parent levels, then that bit is chosen as split index bit. In other cases, the process picks the first index in the sorted level split index array that is also the subset's best split. If keys are split evenly at each level, it is possible to achieve all the bits required in O(log(N)) iterations, where N is number of elements colliding in hash bucket. This process achieves the selection of a minimal set of bits for resolving collisions. It is also gives good insertion times for adding a hash table element with regard to memory and processor utilization.

FIG. 1A is a diagram of an example hash table structure. The example is a simplified table with a root node NT_MT-RIE, which can reference any number of additional nodes including compress and leaf nodes. A simplified example of a hash table with a single compress node that references a set of leaf nodes is shown. However, one skilled in the art would understand that any number of additional nodes and levels of nodes can be included in the hash table. This hash table is traversed by hardware lookup engine. The hardware engine uses hash bits and lookup key bits to traverse this structure in memory.

FIG. 1B is a diagram of an example root node of the hash table. In one example embodiment, an Mtrie node can be the root node of a hash table. In this example, the node is 8 bytes in size. The fields include a type field, checksum, stride, key index, base RID and base offset. The maximum stride size supported on can be 20 bits or a similar size. The base RID and offset point to the start of child array. A leaf node can have a similar composition, except it includes the element or a pointer to the element. NT_MTRIE root node can be setup by software to use the hash-bits, or a subset of hash-bits to index into first level array of buckets. In most of the cases there will be no collision, and a leaf can be found in one memory access.

FIG. 1C is a diagram of an example compress node of the hash table. These nodes are used to resolve collision. The compress node allows the user to specify a set of bit position (extract_bits) for differentiating the keys that collide at the corresponding key index. Instead of extracting a contiguous key segment of size stride starting from keyidx, in the compress node case the process pulls bits from the positions specified by the extract bit to form the compressed key.

The first bit of a compressed key is implicitly picked from the location specified by the field keyidx and each subsequent bit of the compressed key is pulled from an offset specified by an extract bit field relative to the previous bit pulled. The stride field specifies the total number of bits to be pulled and also specifies the size of the child array to be indexed (i.e., 2^stride). The index into the array is the key segment extracted.

For example, the following three MAC addresses (de:ad:be:ef:00:00, fa:ce:0f:ff:00:00, ab:cd:ef:00:00:00, using hexadecimal) may happen to collide to the same bucket in the hash table if used as keys with a specific hash function. The bits [1, 2] (i.e., using the most significant bits (MSB) and zero numbering) are sufficient to differentiate between the 3 keys (i.e., the example MAC addresses. In this case, the stride size would be set to 2. Extracting these bits from each of these keys provides an index of (2, 3, 1) respectively. The child array constructed for this case would be of size 4 (i.e., 2^2) and will contain the elements corresponding for each of the keys.

Hardware engines are available to compute a 32 bit hash. NT_MTRIE root node can use only 20 bits or fewer hash bits. It is possible to use unused hash bits along with the key to compute the compressed bits for collision resolution. Due to the nature of hash bits, colliding keys can be more evenly split, thus helping in selecting a smaller number of compressed bits for the compressed key.

It is also possible to include an option in a compress node to compute a secondary hash function. In this case, hardware can compute a secondary hash function and use that to index into second level array. If you can specify different secondary hash functions on a per bucket basis, then you can almost always select another secondary hash that would give the desired result. Although current hardware does not provide an option to include secondary hash function, it could be added in the future.

Figure 2:
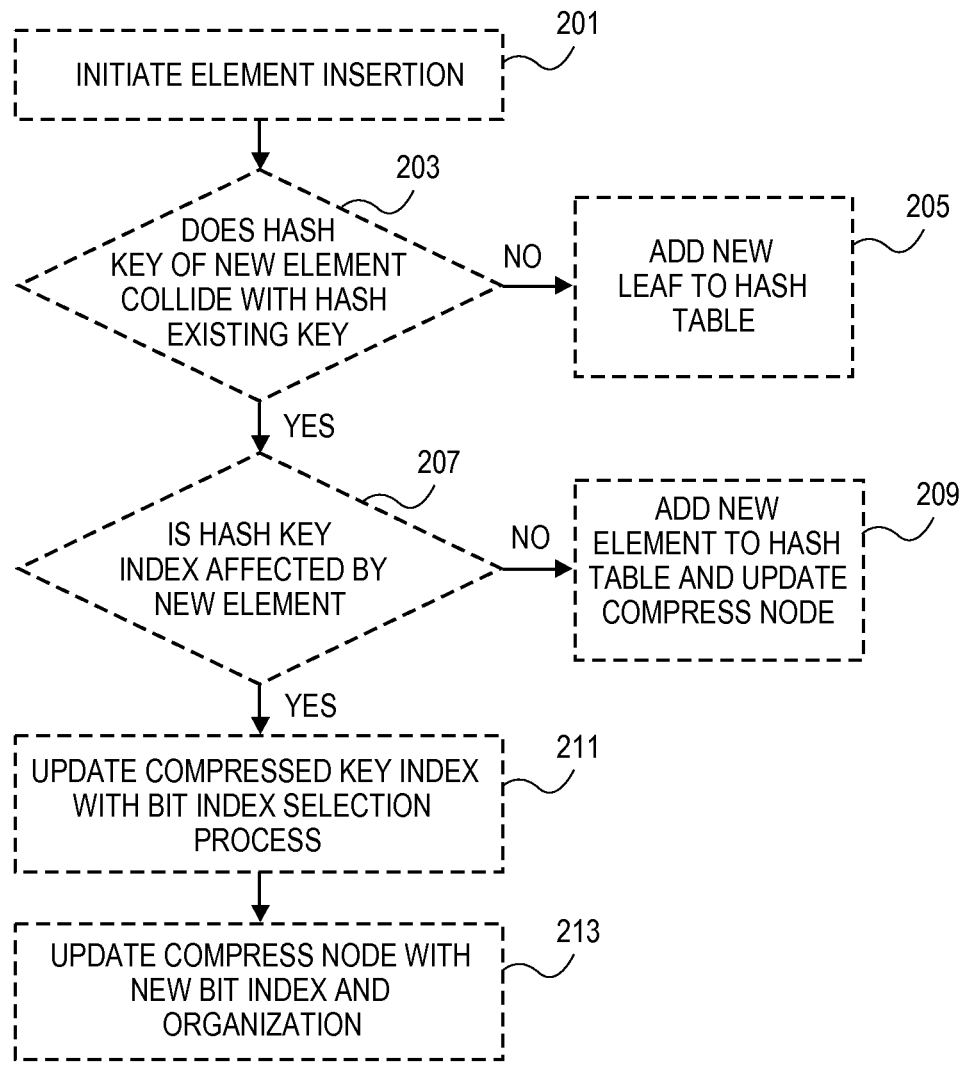
FIG. 2 is a flowchart of one embodiment of a process for adding an element to the hash table.

FIG. 2 is a flowchart of one embodiment of a process for adding an element to the hash table. In one example embodiment, the compressed key generation process may be utilized during hash table manipulation such as the adding of an element to the hash table. If the hash table is used, for example to store subscriber records containing subscriber specific policies, accounting information and similar data, then when a new record is to be added or an old record is to be removed, a hash table function such as an add or delete function is called to make the necessary changes to the hash table data structure. The changes to the hash table data structure can result in the addition or removal of an element (e.g., the subscription record) from the hash table what has a lookup key that collides with other the keys of other elements. Thus, the calculation and composition of the compressed key and the organization of the compress node must be updated. The example, described further herein below, relates to a function for adding an element to the hash table. However, one skilled in the art would understand that the process and features can also be applied to other functions that modify the hash table and specifically alter the compress nodes of the hash table, such as deletion and updating functions.

In the example, the process can be initiated by a call to insert a new element into the hash table (Block 201). The insertion function can check whether the hash of the key for the new element collides with an existing hash key in the hash table by hashing the key of the new element and identifying the location for the hash key in the hash table (Block 203). If the hash key of the new element does not collide with other hash keys, then the element can be added to the hash table as a new leaf or can similarly be added to the hash table (Block 205).

If the hash key of the new element does collide with another hash key, the check is made whether the collision affects the existing compress key indexing of the corresponding compress node (Block 207). If the compress node compress key indexing is not affect, that is the new element can be added into the existing compress key indexing structure at an empty slot in the indexed array and location in the hash table, then the new element is added and the compress node is updated (Block 209).

However, if the compressed key indexing cannot accommodate the new element, the compress key indexing is updated with a bit index selection process (Block 211). The bit index selection process for forming compressed keys is discussed further herein below in regard to FIG. 3. After the bit selection process has completed to define new compressed keys for the compress node, then the compress node is updated using the new bit indexing (i.e., new compressed keys) and to fix the organization of the compress node to include the new element according to the location indicated by the bit selection process (Block 213).

Figure 3:
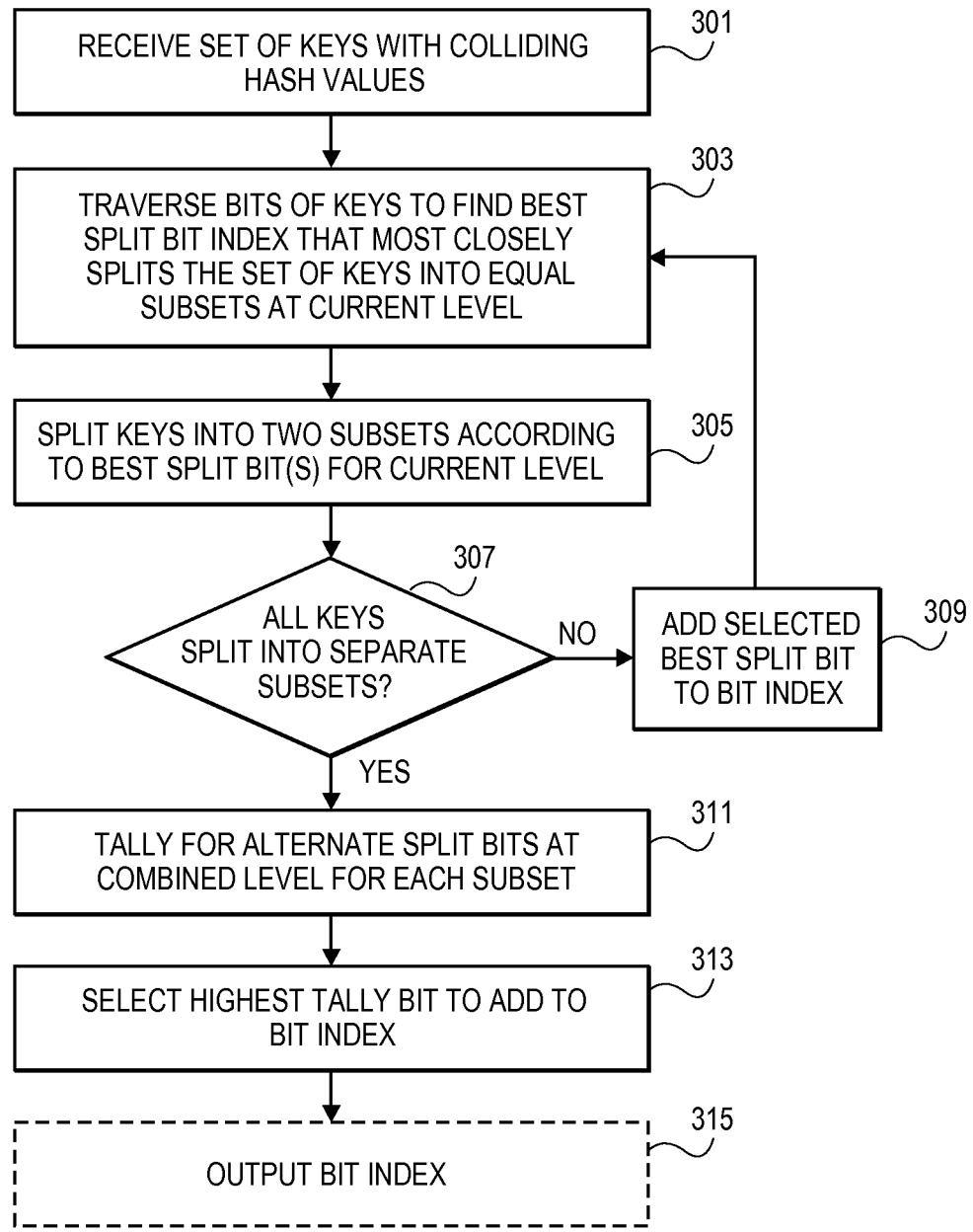
FIG. 3 is a flowchart of one embodiment of a process for generating a compressed key.

FIG. 3 is a flowchart of one embodiment of a process for generating a compressed key. This process for identifying the bit indices to form a compressed key to be used in collision resolution can be called by hash table functions that modify the compressed nodes of the hash table or under similar circumstances. The process receives the set of keys with colliding hash values from the calling function (Block 301). Any number of keys can be provided to the bit selection function. The keys can have any length or value such that all of the keys have the same length and differing values. The hash function or the hash value of the keys can also be provided. The set of keys can be traversed bit by bit to find a best split bit index that most closely splits the set of keys into equal subsets at the current level. The bit index is the position within each key, with the most significant bit referred to as the [0] index and increasing to the length of the keys (e.g., a 8 bit key would have indexing from 0 to 7) with all keys handled with the same orientation and indexing scheme to enable consistent comparison of the keys. The best split bit is the index location where the values of each of the set of keys at the corresponding bit location most closely falls into a 50-50 split of keys with a '0' value at the location and keys with the '1' value at the location assuming all values are analyzed at the binary bit level. If multiple bit indexes have identical split ratios then any of the bit indexes can be utilized based on any tie-breaking process. In one example embodiment, a lowest index or more significant bit can be preferred over other bits with similar ratios. In some embodiments, the process selects a single best split bit before proceeding, while in other embodiments separate processes analyze each possible best split bit in parallel or iteratively instead of tie breaking. In one embodiment, in levels after the first where there are multiple groups of keys being analyzed for splitting, a tally for each best split bit can be maintained in a split index array, which is used to select a bit index for the level with a bit already utilized by previous levels or a highest count bit index preferred for selection. This minimizes the number of bit indices needed to uniquely identify each key with a compressed key.

Using a selected best split bit, the set of keys is split into two subsets according to the values of the bits of the corresponding keys in the selected bit location (Block 305). The resulting subsets can be of any size and have differing sizes from one another. A check can be made to determine if the split has resulted in each subset having a single key within it (Block 307). If any of the subsets contain more than one key, then the process continues by adding the selected best bit into a bit index that will form the new compress key (Block 309). The subsets with more than one key will then be further bifurcated by identifying additional best split bits for each subset (Block 303). This analysis of the subsets can be considered to be processing of a next level of a hierarchical array of the keys.

However, if all of the subsets have been generated such that they have all been sorted into separate subgroups that are the leaves of the hierarchical array of keys navigable by the selected best split bits, then the process can continue by tallying the alternative best split bits for each subset at a combined or flattened level of the hierarchical array using a split index array (Block 311). In other words, the best split bits for each of the nodes of the hierarchical array are counted. From this tally, the best bits for adding to the bit index can be selected such that bits already in the bit index are preferred and that all subsets can be uniquely identified with a unique compressed key value using the selected bit index (Block 313). This compressed key or selected bit index can then be output to the calling function as a result of the request, thereby providing the calling function with an optimal compressed key for differentiating the colliding hash key values of the set of provided keys.

Figure 4:
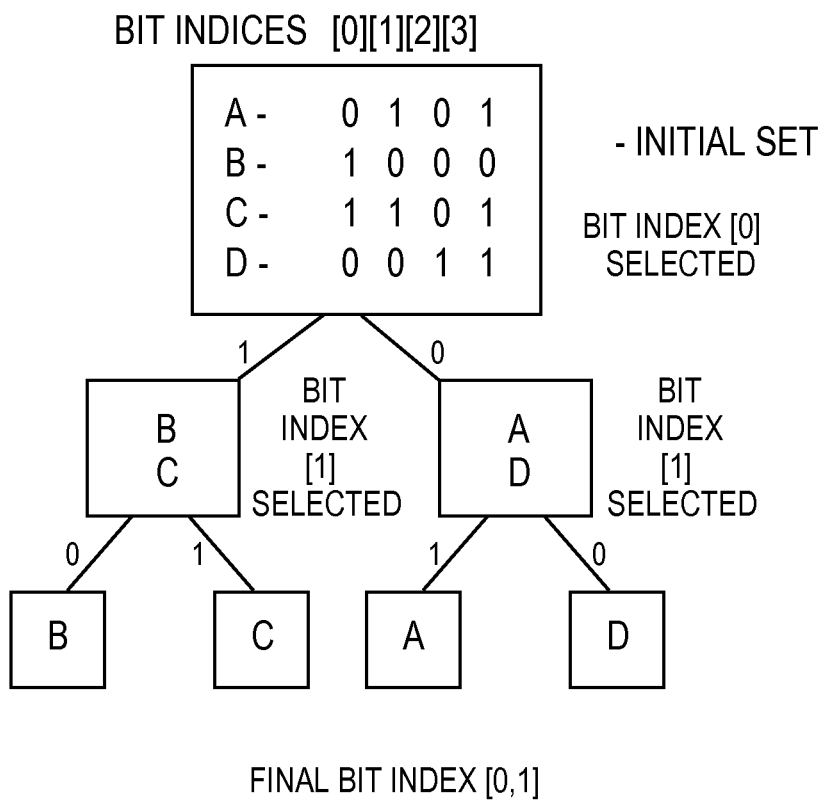
FIG. 4 is a diagram of an example application of the process for generating a compressed key.

FIG. 4 is a diagram of an example application of the process for generating a compressed key. In the illustrated example, the bit index selection process for compressed keys is operating on an initial set of keys (A, B, C and D). In the example, bit index [0] and bit index [1] both are options for equally splitting the set of keys into two equal subsets. A tie break of selecting the most significant bit can be utilized to select bit index [0] in this first level.

The keys are then divided into two subsets according to the values of the selected bit index [0]. The keys with a value of 1 at this bit index are placed in a first subset and the keys with a value of 0 at this bit index are placed in the second subset. As a result, keys B and C are placed in one set and keys A and D are placed in the second subset. Each of these subsets is then processed to find best split bits. For the first subset any of bit indices [1 and 3] can be utilized. For the second subset any of bit indices [1 and 2] can be utilized. Each of these options can incur a tally or vote in the final level of the process, such that bit index [1] would receive the greatest tally or vote. This bit index would then be added to the already selected index of 0 to produce a final set of bit indices of [0, 1]. This can be used to generate compressed keys that uniquely identify each of the keys relative to one another.

Figure 5:
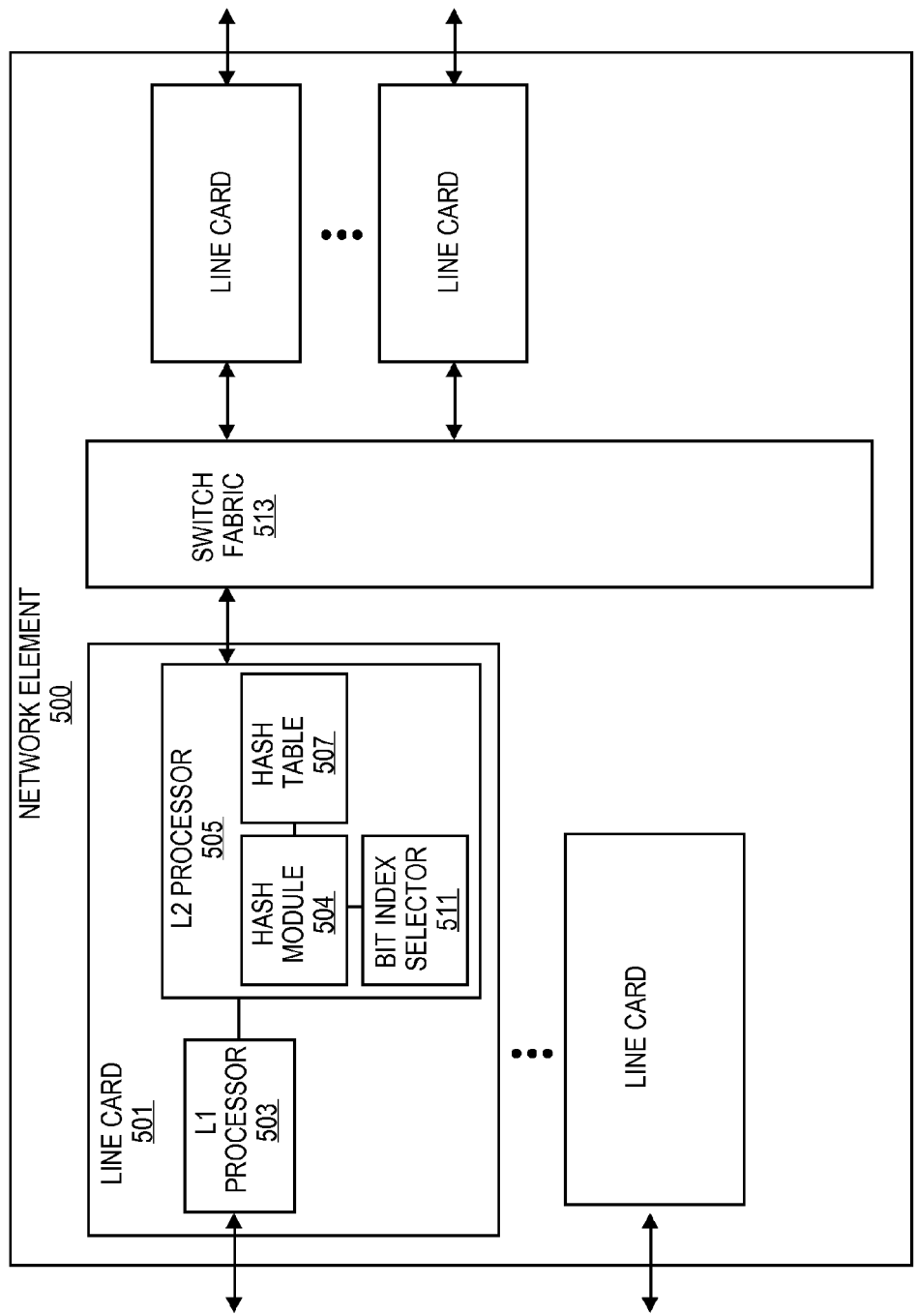
FIG. 5 is a diagram of one embodiment of a network element implementing the process for generating the compressed key.

FIG. 5 is a diagram of one embodiment of a network element implementing the process for generating the compressed key. In one embodiment, the process can be implemented in a network element 500. The process for compressed key determination could also be implemented in other computing devices that use hash tables or that are in communication with devices that use hash tables. For sake of clarity, the example of implementation in a network element is given. However, one skilled in the art would understand that the principles and structures described herein with regard to network element implementation are applicable to other implementations.

The network element can include any number of line cards 501 in communication with one another over a switch fabric 512. The line cards 501 can include level 1 and level 2 processors 503 and 505. These processors can include hash tables 507 for storing important forwarding, policy, or similar data. The hash tables 507 can have any size or number of elements stored within them. The hash tables 507 can be stored in memory within a processor or in separate memory space accessible to the processors. Any number of separate hash tables can be maintained by the processors 503, 505 or other components of the network element 500.

The hash tables 507 can be maintained (i.e., elements added, deleted or modified) by a hash module 504 that includes hash table maintenance functions. The hash module 504 can call a bit index selector to determine a set of bits to utilize to form compressed keys for collision resolution when a bucket of the hash table has multiple keys assigned to it using a compression node. The bit index selector 511 operates to efficiently locate the best bits and returns them to the hash module 504 to be used to structure the compress nodes. The bit selector 511 operates as described herein above and minimizes the memory requirements and computational resources that are required to obtain the bit indices of the compressed keys. This in turn makes the hash module functions more efficient that affect the bit index selection.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network element to identify a set of bit indices for forming compressed keys, the compressed keys are used to map a set of keys of corresponding input values to assigned lookup values in a hash table, where the keys of the input values have colliding hash values according to a hash function of the hash table, the method comprising the steps of:
   receiving the set of keys having colliding hash values;
   traversing bits of the set of keys to find a best split bit index that most closely splits the set of keys into equal subset at a current level of the array of bit indices;
   splitting the set of keys into two subsets according to the best split bit index for the current level;
   checking whether all of the set of keys have been split into separate subsets;
   adding a selected best split bit to a bit index, for subsets larger than one key;
   tallying alternate split bits at a combine level for each subset of the keys; and
   selecting a bit with a highest tally to add to bit index.

2. The method of claim 1, further comprises the steps of:
   outputting the bit index to be utilized for generating compressed keys for colliding hash values.

3. The method of claim 1, further comprising:
   iterating through each subset of the set of keys to find a best split bit index.

4. The method of claim 1, further comprises the step of:
   using a tie-breaker to select the best split bit where a plurality of bit indices has equal split ratios.

5. The method of claim 1, further comprises the step of:
   iterating through permutations of best split bits having equal split ratios to find an optimal set of bit indices for use in forming the compressed keys.

6. A network element to execute a process to identify a set of bit indices for forming compressed keys, the compressed keys are used to map a set of keys of corresponding input values to assigned lookup values in a hash table, where the keys of the input values have colliding hash values according to a hash function of the hash table, the network element comprising
   a storage device to store a hash table including a plurality of elements mapped to the set of keys using the hash function;
   a network processor configured to execute a hash module and a bit selector, the hash module to update hash table, the bit selector to receive the set of keys having colliding hash values from the hash module, to traverse bits of the set of keys to find a best split bit index that most closely splits the set of keys into equal subset at a current level of the array of bit indices, to split the set of keys into two subsets according to the best split bit index for the current level, to check whether all of the set of keys have been split into separate subsets, to add a selected best split bit to a bit index, for subsets larger than one key, to tally alternate split bits at a combine level for each subset of the keys, and to select an index bit with a highest tally to add to the bit index.

7. The network element of claim 6, wherein the bit selector is further configured to output the bit index to the hash module to be utilized for generating compressed keys for colliding hash values.

8. The network element of claim 6, wherein the bit selector is further configured to iterate through each subset of the set of keys to find a best split bit index.

9. The network element of claim 6, wherein the bit selector is further configured to use a tie-breaker to select the best split bit where a plurality of bit indices have equal split ratios.

10. The network element of claim 6, wherein the bit selector is further configured to iterate through permutations of best split bits having equal split ratios to find an optimal set of bit indices for use in forming the compressed keys.

* * * * *